(12) United States Patent
Sinharoy et al.

(10) Patent No.: US 12,306,759 B2
(45) Date of Patent: May 20, 2025

(54) PSEUDO LOCK-STEP EXECUTION ACROSS CPU CORES

(71) Applicant: Google LLC, Mountain View, CA (US)

(72) Inventors: Balaram Sinharoy, Cupertino, CA (US); Peter Hochschild, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/234,633

(22) Filed: Aug. 16, 2023

(65) Prior Publication Data

US 2024/0086327 A1 Mar. 14, 2024

Related U.S. Application Data

(60) Provisional application No. 63/405,618, filed on Sep. 12, 2022.

(51) Int. Cl.
*G06F 12/00* (2006.01)
*G06F 12/0842* (2016.01)
*G06F 12/0891* (2016.01)

(52) U.S. Cl.
CPC ...... *G06F 12/0842* (2013.01); *G06F 12/0891* (2013.01)

(58) Field of Classification Search
None
See application file for complete search history.

(56) References Cited

U.S. PATENT DOCUMENTS

| 10,642,782 | B2* | 5/2020 | Han | G06F 11/073 |
| 2017/0300427 | A1 | 10/2017 | Lin et al. | |
| 2020/0309851 | A1* | 10/2020 | Narayanan | G01R 31/318555 |

FOREIGN PATENT DOCUMENTS

| EP | 0800138 A1 | 10/1997 |
| WO | 2015097493 A1 | 7/2015 |

OTHER PUBLICATIONS

Extended European search report for European Appl. No. 23196109.5 dated Feb. 5, 2024. 12 pages.

* cited by examiner

*Primary Examiner* — Daniel D Tsui
(74) *Attorney, Agent, or Firm* — Lerner David LLP

(57) ABSTRACT

The present disclosure provides for automatically detecting errors, such as SDC, in a multi-core computing environment. For example, cores may run in an error detection mode, in which multiple cores repeat the same execution of instructions and the results are compared. Based on the results, it may be determined whether one of the cores is failing.

16 Claims, 3 Drawing Sheets

PSEUDO LOCK-STEP EXECUTION ACROSS CPU CORES

CROSS-REFERENCE TO RELATED APPLICATIONS

This application claims the benefit of the filing date of U.S. Provisional Patent Application No. 63/405,618, filed Sep. 12, 2022, the disclosure of which is hereby incorporated by reference herein.

BACKGROUND

Silent Data Corruption (SDC) has increased significantly as central processing units (CPUs) have evolved. This can be a result of technology node shrink, less reliable transistors, reduction in design margin and guardbands. SDC can also be a result of insufficient burn-in testing, exponential increase in a number of transistors, etc.

Many different types of failures may occur in CPUs or larger systems including the CPUs. Examples of such errors include machine check exceptions (MCE), SDC, etc. Memory and cache subsystems often have extensive failure detection and mitigation mechanisms, such as parity, error correction code (ECC), redundancy at many levels, memory scrubbing, memory mirroring, redundant array of independent memory (RAIM), cache line delete, set delete, spare data lanes, cyclic redundancy check (CRC), etc. CPU cores also have a number of detection and mitigation mechanisms built in, such as parity and ECC protection of various architected registers, caches, and other structures, processor instruction retry, use of radiation-hardened flip-flops, residue checking of floating-point and fixed-point pipeline, etc.

If a checker is put in a logic path or storage structure to check for errors and the checker triggers, the trigger may result in a detected unrecoverable error (DUE) or MCE. If an error is not detected by a checker and the error changes a final result, the error results in an SDC. The error checking mechanisms in existing CPU cores are not robust enough to detect SDC errors.

BRIEF SUMMARY

The present disclosure provides for automatically detecting errors, such as SDC, in a multi-core computing environment. For example, cores may run in an error detection mode, in which multiple cores repeat the same execution of instructions and the results are compared. Based on the results, it may be determined whether one of the cores is failing. In a production environment, the cores may be run in error detection mode by running production code. The cores may execute the same workload, in the same runtime environments, under the same conditions or parameters, such as voltage, frequency, temperature, altitude, etc. The cores may also be run in error detection mode for a period of time during deployment to detect cores that are failing. After deployment, the cores may be run in error detection mode periodically to detect cores that begin failing over time.

DETAILED DESCRIPTION

The present disclosure provides an error detection mechanism, such as for detecting silent data corruption (SDC). The mechanism includes a primary core and a secondary core that operate in a pseudo-lockstep mode, in which both cores execute the same instruction segment. A line eviction synchronizer ensures that corresponding cache lines generated from the primary core's L2 cache and the secondary core's L2 cache are provided to a checker at approximately the same time. The corresponding cache lines can then be compared to determine if there is an exact match.

To implement the error detection mechanism, each core may include a counter to keep track of committed instructions. Each core may further include instructions for managing operations of the primary core, such as coordinating the count of committed instructions prior to handling interrupts, and identifying cache lines that should not be included in the comparison. A system-on-chip (SoC) including the primary and secondary cores may include an eviction table for storing cache lines that have yet to be compared. It may further include a comparator that ensures that pairs of lines from the eviction table have the same value. Further, it may include a mechanism, such as a synchronizer, to drain two L2 caches line-by-line such that they are sent to the eviction table for checking by the comparator.

Figure 1:
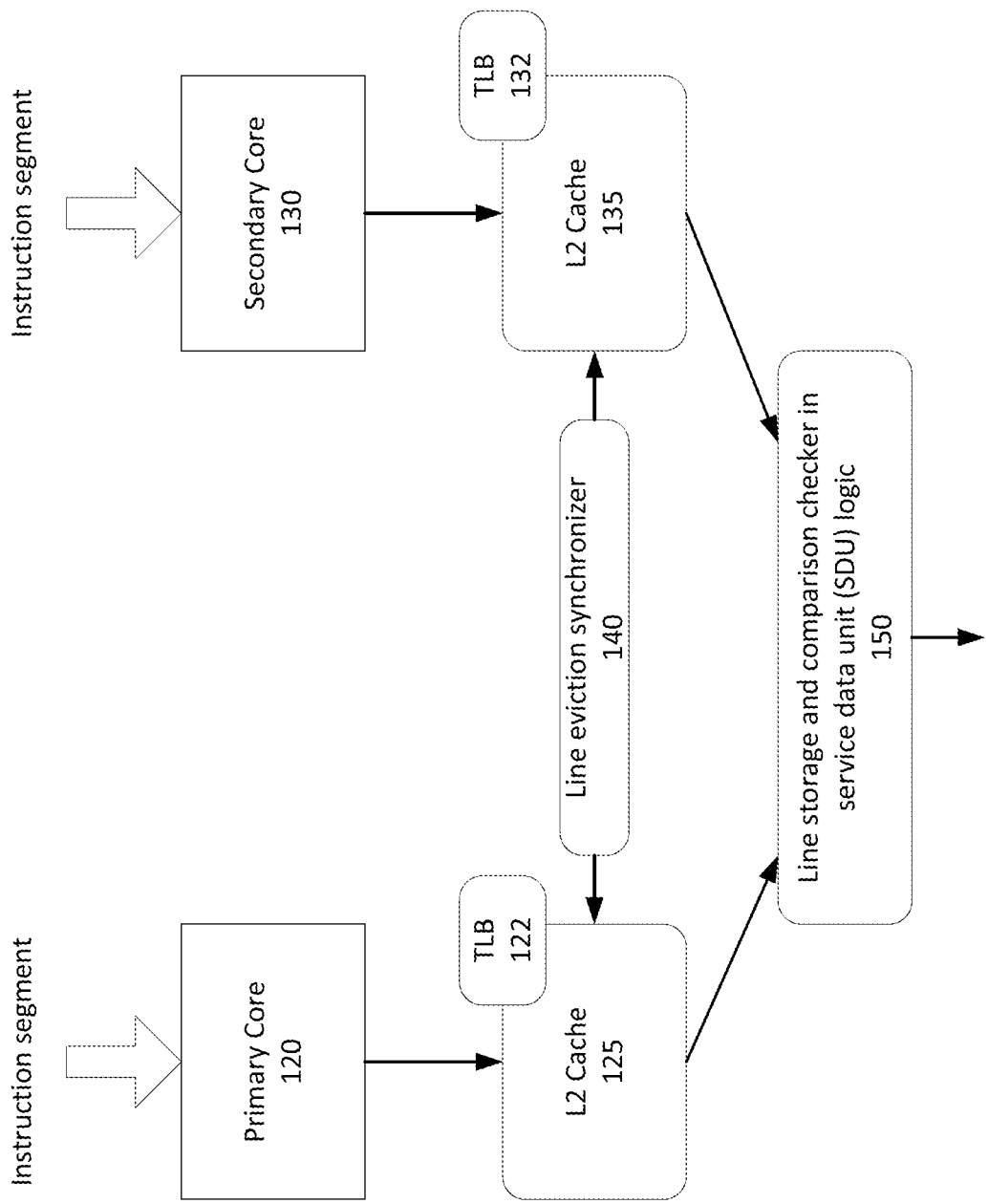
FIG. 1 is a schematic diagram of an example system according to aspects of the disclosure.

FIG. 1 is a schematic diagram illustrating an example system and method for error detection in processing cores. A software thread is divided into multiple segments. A given segment of the software thread is executed concurrently by a primary core, such as first core 120 (indicated as a "primary core" 120 in FIG. 1), and a secondary core, such as second core 130 (indicated as a "secondary core" 130 in FIG. 1). In particular, both cores 120, 130 run the same code on the same data. As the instruction segment is executed, the first core 120 stores results in a first L2 cache 125 and the second core 130 stores results in a second L2 cache 135. The execution of instructions and storing of results in the L2 caches 125, 135 need not be performed synchronously by the first and second cores 120, 130. A line eviction synchronizer 140 pushes corresponding lines from each cache 125, 135 to a checker 150. The checker 150 may be, for example, a comparator. The checker 150 analyzes the corresponding cache lines to determine whether either of the cores 120, 130 is failing.

The first and second cores 120, 130 may be any of a variety of types of processing cores. By way of example, the processing cores may be cores of a CPU, a graphics processing unit (GPU), a tensor processing unit (TPU), a field-programmable gate array (FPGA), an application-specific integrated circuit (ASIC), etc.

The first core 120 may be a "primary" core while the second core 130 is a "secondary" core. The first core 120 may be visible to application software, while the second core 130 is not visible to the application software. For example, the secondary core simply repeats what the primary core does without really having any impact on the rest of the system. While the first core 120 stores data in memory, such as system level cache (SLC) and memory, the second core 130 does not store data beyond its L2. Interrupts generated by the first core are processed normally after initial synchronization, but the interrupts generated by the second core 130 may be handled differently based on the type of interrupt.

The first and second cores 120, 130 can process the instruction segment at different rates, touch different cache lines, and execute different instructions. However, the first and second cores 120, 130 will commit the same set of instructions. In the L2 caches 125, 135, a least recently used (LRU) state of cache lines can be different in each cache, because the instructions executed by the first and second cores 120, 130 can touch different cache lines at different times.

As the instruction segment is executed by the first and second cores 120, 130, the results are written to L2 caches 125, 135. Each write may be referred to as a store. In some examples, the results may be initially cached in L1 caches (not shown) within the respective cores 120, 130. Eviction from the L1 caches and storing into the L2 caches may occur at slightly different times for the two cores. If the L2 cache is designed not to be inclusive of the L1 cache, then when a cache line is evicted from L2 cache, the same line must also be evicted from L1 cache if it is there. The lines in the two L2 caches should have the same content at the time when they are evicted from the L2 cache, since before eviction the two L2 caches 125, 135 are synchronized to ensure that the caches have seen the same set of store operations.

As shown, each core 120, 130 may include a respective main translation lookaside buffer (TLB) 122, 132, which keeps a subset of the entries in the page table in memory. Each core may have an instruction TLB and a data TLB, which keep a subset of the entries in the main TLB. According to some examples, only the first TLB 122, for the primary core 120, may track references, changes, or other information for a page. When a new entry is created in first TLB 122, the same entry is also created in second TLB 132. When an entry is removed from the first TLB 122, the entry is also removed from the second TLB 132.

At the end of execution of each instruction segment, the entire L2 caches 125, 135 may be drained to ensure the contents of each L2 cache match. If the content matches, a subsequent instruction segment may be executed by the first and/or second core 120, 130. Alternatively, operation of the first and second cores 120, 130 is executed in pseudo-lockstep mode, in which the cores 120, 130 execute the same instruction segment and the results are compared and terminated based on the comparison. If the content does not match, it may be determined that an error has been detected.

According to some examples, each core 120, 130 may indicate a number, or count, of instruction set architecture (ISA) instructions that have been committed at a given point in time. For example, a "committed-instruction-count" can track a number of instructions committed by the primary and secondary cores 120, 130. The count can be reset by, for example, the respective core 120, 130. The first and second cores 120, 130 may be synchronized to start execution from the same program counter, with the count set to zero. For example, each core 120, 130 may include a counter that keeps track of the "committed-instruction-count." Privileged instructions may be executed before starting execution of the instruction segment or when the instruction segment is near completion. Such privileged instructions may include, for example, instructions to reset all the architected states, to flush the L1 and L2 caches and the TLBs, reset the committed instruction count register, to pause or unpause operation of either core, skip comparing portions of the instruction segment, evict lines of cache from L2, etc.

Prior to executing a first instruction in the segment, L1 and L2 caches 125, 135 may be flushed. The register holding the count of committed instructions may be set to zero. When a cache line is loaded into the first L2 cache 125, the same line is loaded into the second L2 cache 135 in the same way. While corresponding loads into each of the first and second L2 caches 125, 135 may occur at approximately the same time, the loads need not be synchronized.

The line eviction synchronizer 140 may be, for example, a module in the primary core or the primary L2 cache that sends a read request to both primary's and secondary's count, which causes a temporary pause of completion in the cores. The line eviction synchronizer 140 may force eviction of the same cache line from each of the first L2 cache 125 and the second L2 cache 135 at approximately the same time. The cache lines evicted from the first and second L2 caches 125, 135 may be sent to checker 150.

When the synchronizer 140 receives the two counts, it determines whose count is higher and by how much, with the difference in count=N. The synchronizer 140 sends a signal to the core with higher count to flush the pipeline and pause instruction fetch. The synchronizer 140 also sends a signal to the core with the lower count and the number N. That core then unpauses completion, then waits for N more instructions to commit, then flushes the pipeline and pauses instruction fetch. When all the completed stores from the cores have been drained to the L2 cache, the selected L2 line(s) from the drained cache can be evicted. After the selected L2 line(s) are evicted the synchronizer 140 unpauses the cores and normal execution resumes. If the L2 cache is not inclusive, the lines evicted from the L2 cache must also be evicted from L1 data cache.

All lines evicted from the first L2 cache 125 are also evicted from the second L2 cache 135 at about the same time, when the "committed-instruction-count" for each L2 125, 135 reaches the same number. In this regard, the first and second L2 caches 125, 135 may communicate with each other directly or through one or more other components. Communication between the first and second L2 caches to coordinate the eviction may be initiated by either the first L2 cache 125 or the second L2 cache 135. For example, the first L2 cache 125 may send a read request to the second cache 135 to obtain the "committed-instruction-count" for the second L2 cache 135. The committed-instruction-count indicates a number of loads and stores, such as values entered as a result of store operations, completed by the core at a given point in time. The second L2 cache 135 may send its count in response.

According to one example approach for communication and coordination between the first and second L2 caches, upon receipt of the count, the first L2 cache 125 may pause its store operations. This may cause the second L2 cache 135 to also pause its store operations.

If the count from the second L2 cache 135 is lower than the count of the first L2 cache 125, the first L2 cache 125 may evict its cacheline. The evicted line may be sent to the checker 150 and temporarily stored for later comparison. The first L2 cache 125 then sends a signal to unpause the second L2 cache store operations. The first L2 cache 125 may also send its count to the second L2 cache 135, either with the unpause signal or separately. When the second L2 cache 135 reaches the same count as indicated by the first L2 cache 125, the second L2 cache 135 evicts its cacheline, such as by sending it to the checker 150 for comparison with the temporarily stored corresponding cacheline from the first L2 cache 125.

If the count from the second L2 cache 135 is higher than the count of the first L2 cache 125, the first cache 125 instructs the second cache 135 to evict its cacheline to the checker 150. The first L2 cache 125 may also instruct the second L2 cache 135 to unpause store operations after the line is evicted, and the first L2 cache 125 unpauses as well. When the first L2 cache 125 reaches the same count as the second L2 cache 135, it evicts its line and sends it to the checker 150 for comparison.

If the count from the second L2 cache 135 is the same as the count of the first L2 cache 125, the first L2 cache 125 evicts is cacheline to the checker 150 and unpauses itself. The first L2 cache 125 also sends a signal to the second L2 cache 135 to evict its cacheline to the checker 150 and to unpause storing operations.

According to a second example approach for communication and coordination between the L2 caches 125, 135, a synchronizer in the first core 120 or the first L2 cache 125 sends a read request to read the "committed-instruction-count" from each of the first core 120 and the second core 130. This may cause a temporary pause of completion in the cores 120, 130. Then the synchronizer receives both counts, it determines which count is higher and by how much. For example, the difference in count may be represented by N. The synchronizer sends a signal to the core with the higher count to flush its pipeline and pause instruction fetch. The synchronizer also sends a signal to the core with the lower count, indicating the difference N. That core unpauses completion and waits for N more instructions to commit, and then flushes its pipeline and pauses instruction fetch. When all completed stores from both cores have been drained to L2, selected L2 cache lines can be evicted. According to some examples, multiple L2 cache lines may be evicted at the same time. After the selected lines are evicted, the synchronizer unpauses the cores and normal execution resumes. If L2 is not inclusive, the lines evicted from L2 are also evicted from L1.

The checker 150 may be, for example, implemented in the control logic in a L2 cache, L3 cache or at the interface to the core-to-core communication network or in a control logic in between the two cores. The checker 150 compares the lines of data, produced by instructions, from the first L2 cache 125 with the lines of data from the second L2 cache 135. In this regard, the checker may review each L2 cache line written during the execution of the instruction segment to determine whether the results from the first core 120 match the results of the second core 130. If the content in each line matches, a next segment of instructions may be similarly processed by both cores 120, 130 and analyzed. If the content in each line does not match, it may be determined that an error has occurred in one of the first or second cores 120, 130.

According to some examples, the checker 150 may have a storage structure for storing the cachelines received from the first and second L2 caches 125, 135. The structure may have a number of entries corresponding to a number of outstanding L2 misses that a core can have. The storage structure may be, for example, a table or other structure.

While the example above describes comparing results of instruction segment execution by two cores 120, 130, in other examples additional cores may be included in the analysis. For example, a third, fourth, or more cores may also process the instruction segment processed by the first and second cores 120, 130, and the values stored by all of the cores, or any subset of the cores, may be compared with one another. In some examples, analyzing additional cores may help to more readily identify which core is failing when there is a mismatch in the values stored by each core. For example, if four cores store the same values and a fifth core stores different values, it may be determined that the fifth core is experiencing errors or failing.

While the system above compares the results of the instructions executed by the first and second cores, inherent differences in execution by the two cores may still be allowed. Such inherent differences may be due to, for example, speculative execution, out-of-order execution, different branch prediction, etc. This causes the LRU states in the two L2 caches 125, 135 to be different. The L2 LRU states from the primary core 120 for cache replacement is honored. In other words, the primary core decides which line to replace, based on its LRU or replacement algorithm. The secondary core will replace the same line, regardless of its own LRU state.

According to some examples, a new L2 cache line to be loaded is determined at the time a L2 miss is detected. This can be sent to an L3 cache, SLC, or memory and communicated back by the L3 cache, SLC, or memory when the line comes back, so that both L2 knows which "way" within the congruence class to load the line into.

External interrupts may be routed to the first core 120 and not to the second core 130. Internal interrupts can be handled normally by the first core 120. Before taking an interrupt, the first core 120 may coordinate the committed-instruction-count of both cores 120, 130. For example, the synchronizer in the first core 120 sends a request to read the "committed instruction count" of the second core 130, causing it to pause instruction fetch and flush its pipeline. After the pause, the second core 130 waits for a signal from the first core 120 indicating from where to restart execution. After reaching the same "committed-instruction-count" the first core 120 takes the interrupt. Accordingly, both cores 120, 130 at this point should have the same architected state. The primary core 120 may set the caches 125, 135 into a "not-to-be-compared" mode so that subsequent stores drained to L2 lines will not be checked for error.

In the not-to-be-compared mode, all subsequent stores may be drained to L2 lines that will not be checked for errors. According to some examples, L2 cache lines storing data in the "not-to-be-compared" mode may include a flag, such as a set bit, or other indicator marking the line so that the checker 150 knows not to compare that line. According to other examples, the flag or bit marking the cache line as not-to-be-compared may be in an L2 directory.

For internal interrupts generated by the second core 130, the second core 130 may be paused and wait for a signal from the first core 120 indicating a point in the instruction segment from which the second core 130 can restart execution. Examples of such internal interrupts may include page fault, unaligned access, illegal op, supervisor call (SVC), etc. If the first core 120 reaches the internally generated interrupt first, the second core 130 will not see it as it will be paused. If the first core 120 reaches the interrupt after the second core 130, it may coordinate the committed-instruction-count and set the caches to not-be-compared mode as described above.

When the first core 120 returns from interrupt, it sends a special interrupt to the second core to allow the operating system to make the second cores architected states to be the same as the first core, it syncs the committed-instruction-count of the two cores 120, 130 to zero and restarts both cores 120, 130 at approximately the same time from the same program counter. Before start of execution, all lines marked as "not-to-be-compared" should be evicted from the first and second L2 caches 125, 135, so that after the restart all L1 and L2 cache contents are the same.

According to some examples, error checking may be skipped if one or more events occurs during execution of a code segment. Such events may include when the code includes self-modifying code, code that depends on a variable specific to the core, etc. To skip particular code regions, the code regions within a segment may be tagged, bracketed, or otherwise marked using instruction set architecture. When the core encounters such regions, it may set the L2 cache to the "not-to-be-compared state" until an end of the code region.

Figure 2:
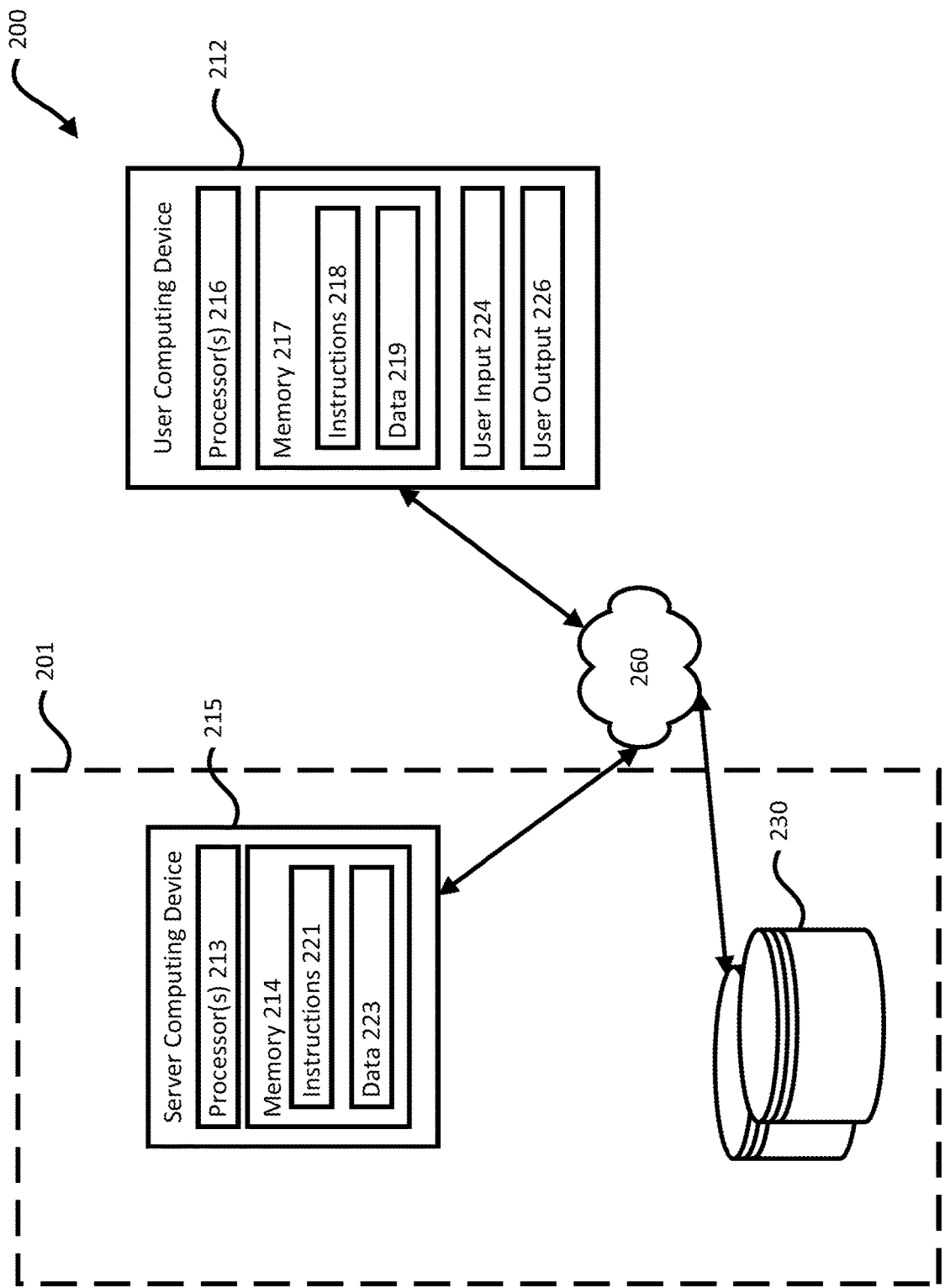
FIG. 2 is a block diagram of an example environment for implementing the system according to aspects of the disclosure.

FIG. 2 is a block diagram of an example environment 200 for implementing the error checking system of FIG. 1. The system can be implemented on a device having one or more processors in one or more locations, such as in server computing device 215. User computing device 212 and the server computing device 215 can be communicatively coupled to one or more storage devices 230 over a network 260. The storage device(s) 230 can be a combination of volatile and non-volatile memory and can be at the same or different physical locations than the computing devices 212, 215. For example, the storage device(s) 230 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 215 can include one or more processors 213 and memory 214. The memory 214 can store information accessible by the processor(s) 213, including instructions 221 that can be executed by the processor(s) 213. The memory 214 can also include data 223 that can be retrieved, manipulated, or stored by the processor(s) 213. The memory 214 can be a type of non-transitory computer readable medium capable of storing information accessible by the processor(s) 213, such as volatile and non-volatile memory. The processor(s) 213 can include one or more processor cores, such as for a CPU, GPU, TPU, FPGA, etc.

The instructions 221 can include one or more instructions that when executed by the processor(s) 213, causes the one or more processors to perform actions defined by the instructions. The instructions 221 can be stored in object code format for direct processing by the processor(s) 213, or in other formats including interpretable scripts or collections of independent source code modules that are interpreted on demand or compiled in advance. The instructions 221 can include instructions for comparing results of instruction segments executed by two processor cores. The instructions 221 can further include instructions for determining, based on the comparison of results, whether one of the processor cores is experiencing an error scenario or is failing.

The data 223 can be retrieved, stored, or modified by the processor(s) 213 in accordance with the instructions 221. The data 223 can be stored in computer registers, in a relational or non-relational database as a table having a plurality of different fields and records, or as JSON, YAML, proto, or XML documents. The data 223 can also be formatted in a computer-readable format such as, but not limited to, binary values, ASCII, or Unicode. Moreover, the data 223 can include information sufficient to identify relevant information, such as numbers, descriptive text, proprietary codes, pointers, references to data stored in other memories, including other network locations, or information that is used by a function to calculate relevant data.

The user computing device 212 can also be configured like the server computing device 215, with one or more processors 216, memory 217, instructions 218, and data 219.

The user computing device 212 can also include a user output 226, and a user input 224. The user input 224 can include any appropriate mechanism or technique for receiving input from a user, such as keyboard, mouse, mechanical actuators, soft actuators, touchscreens, microphones, and sensors.

The server computing device 215 can be configured to transmit data to the user computing device 212, and the user computing device 212 can be configured to display at least a portion of the received data on a display implemented as part of the user output 226. The user output 226 can also be used for displaying an interface between the user computing device 212 and the server computing device 215. The user output 226 can alternatively or additionally include one or more speakers, transducers or other audio outputs, a haptic interface or other tactile feedback that provides non-visual and non-audible information to the platform user of the user computing device 212.

Although FIG. 2 illustrates the processors 213, 216 and the memories 214, 217 as being within the computing devices 215, 212, components described in this specification, including the processors 213, 216 and the memories 214, 217 can include multiple processors and memories that can operate in different physical locations and not within the same computing device. For example, some of the instructions 221, 218 and the data 223, 219 can be stored on a removable SD card and others within a read-only computer chip. Some or all of the instructions and data can be stored in a location physically remote from, yet still accessible by, the processors 213, 216. Similarly, the processors 213, 216 can include a collection of processors that can perform concurrent and/or sequential operation. The computing devices 215, 212 can each include one or more internal clocks providing timing information, which can be used for time measurement for operations and programs run by the computing devices 215, 212.

The server computing device 215 can be configured to receive requests to process data from the user computing device 212. For example, the environment 200 can be part of a computing platform configured to provide a variety of services to users, through various user interfaces and/or APIs exposing the platform services. One or more services can be a machine learning framework or a set of tools for generating neural networks or other machine learning models according to a specified task and training data.

The devices 212, 215 can be capable of direct and indirect communication over the network 260. The devices 215, 212 can set up listening sockets that may accept an initiating connection for sending and receiving information. The network 260 itself can include various configurations and protocols including the Internet, World Wide Web, intranets, virtual private networks, wide area networks, local networks, and private networks using communication protocols proprietary to one or more companies. The network 260 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 260, in addition or alternatively, can also support wired connections between the devices 212, 215, including over various types of Ethernet connection.

Although a single server computing device 215 and user computing device 212 are shown in FIG. 2, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Figure 3:
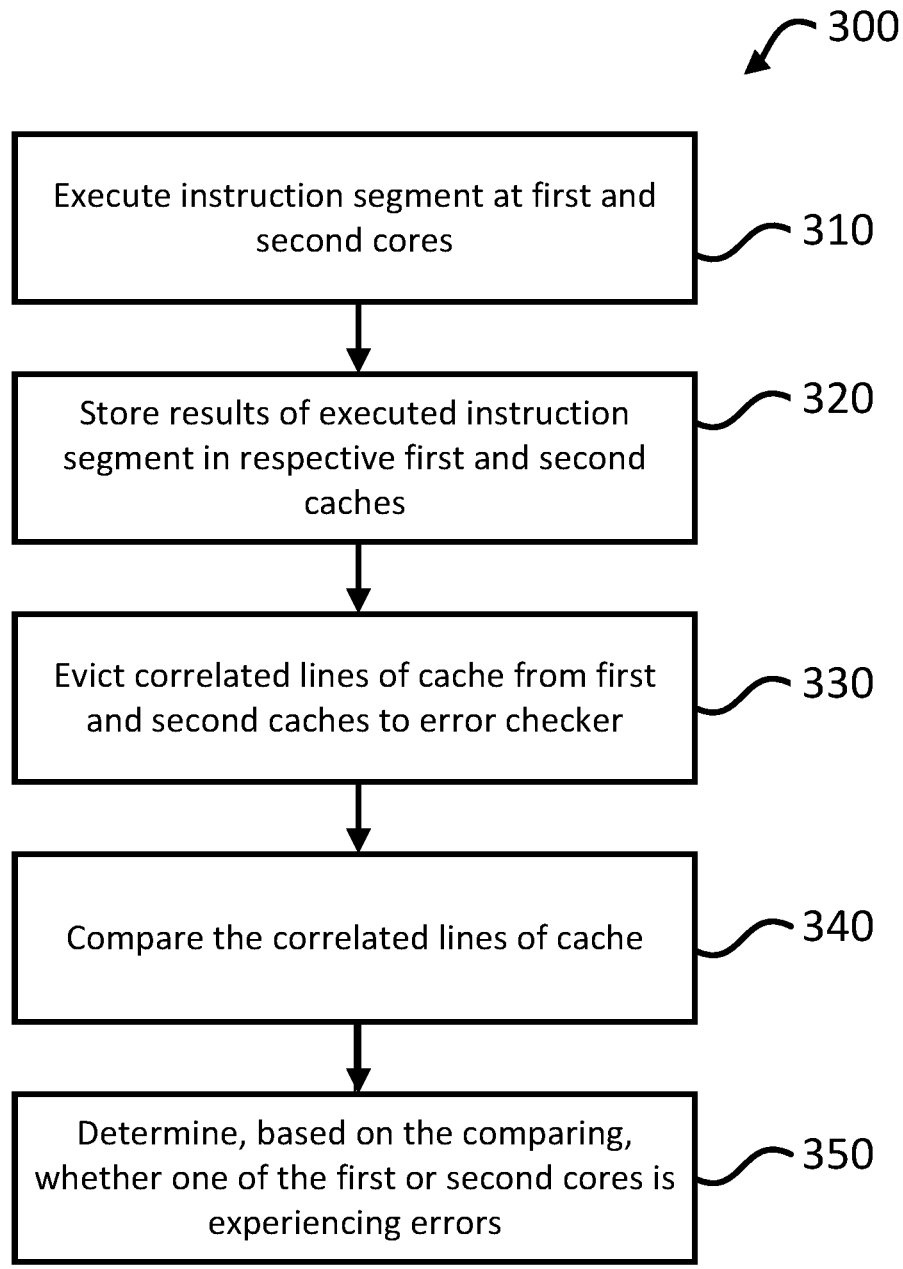
FIG. 3 is a flow diagram of an example method of error checking using execution of instructions across multiple cores according to aspects of the disclosure.

FIG. 3 is a flow diagram of an example process 300 for error detection. The example process 300 can be performed on a system of one or more processors in one or more locations.

As shown in block 310, first and second cores execute an instruction segment. The first core may be, for example, a primary core that is visible to an application for which the instructions are run, while the second core is a secondary core that is not visible to the application. While two cores are described in this example, additional cores may be included in the analysis. The execution may be performed at substantially the same time by the first and second cores, but allows for differences in processing speeds and other events such that the execution does not need to be exactly synchronized.

In block 320, results of the executed instruction segment are stored, by each of the first and second cores, in respective first and second caches. The caches may be, for example, L2 caches. According to some examples, each of the first and second caches may maintain a count of the stored values committed by their respective first and second cores.

In block 330, correlated lines of cache are evicted from the first and second caches and sent to an error checker. The eviction may be coordinated by, for example, the first or second L2 caches. Such coordination may utilize the count of committed instructions maintained by the first and second caches. The checker may be a module implemented in logic in L2 or L3 or on a bus interface. The checker may include a storage structure for temporarily storing the cache lines received from the first and second caches. Corresponding cache lines from the first and second cache can be received at the checker at different times. For example, one cache can send a cache line and pause until the other cache catches up and sends the corresponding cache line.

In block 340, the checker compares the correlated lines of cache. For example, the checker may compare each stored value in the corresponding cache lines to determine if there is a match.

In block 350, it is determined, based on the compare, whether the first or second core is experiencing errors or failing. For example, if the compared values do not match, it may be determined that one of the cores is experiencing errors. According to some examples, a nature or severity of a mismatch can be an indicator of a severity of error or failing of the core.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware and hardware circuits, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
executing a first instruction segment by a first processor core;
storing, by the first processor core, the results of executing the first instruction segment in a first cache;
executing the first instruction segment by a second processor core;
storing, by the second processor core, the results of executing the first instruction segment in a second cache;
coordinating eviction of corresponding cache lines from the first cache and the second cache;
comparing, with one or more processors, results of the first instruction segment executed by the first processor core with results of the first instruction segment executed by the second processor core; and
determining, with the ones or more processors based on the comparing, whether one of the first or the second processor cores is experiencing errors.

2. The method of claim 1, wherein coordinating eviction of corresponding cache lines comprises coordinating a count.

3. The method of claim 2, wherein the count is a count of committed instructions, and wherein coordinating eviction of corresponding cache lines comprises:
sending, by the first cache, a signal to the second cache requesting a count of committed instructions;
receiving, by the first cache, the count of committed instructions from the second cache; and comparing the count of committed instructions from the second cache with a count of committed instructions from the first cache.

4. The method of claim 3, further comprising:
if the count of committed instructions from the second cache is less than the count of committed stores from the first cache, evicting a line including the committed stores from the first cache to a checker for temporary storage and allowing the second cache to catch up;
if the count of committed instructions from the second cache is greater than the count of committed instructions from the first cache, evicting a line including the committed stores from the second cache to the checker for temporary storage and allowing the first cache to catch up; and
if the count of committed instructions from the second cache is the same as the count of committed instructions from the first cache, evicting lines from both the first and second cache to the checker.

5. The method of claim 2, wherein the count comprises a count of at least one of loads or stores.

6. The method of claim 1, further comprising determining, when the results from the first core match the results from the second core, that both cores are operating properly.

7. The method of claim 1, further comprising executing, by the first core and the second core, a second instruction segment.

8. The method of claim 7, wherein the first core and the second core operate in an error checking mode, in which the results from each core are compared, for a limited period of time when the first core and the second core are deployed.

9. The method of claim 7, wherein the first core and the second core operate in an error checking mode, in which the results from each core are compared, for an extended period of time when the first core and the second core are in a testing phase.

10. A system comprising:
a first processor core operable to execute a first instruction segment;
a first cache in communication with the first processor core, the first cache operable to store results of executing the first instruction segment by the first processor core;
a second processor core operable to execute the first instruction segment;
a second cache in communication with the second processor core, the second cache operable to store results of executing the first instruction segment by the second core; and
one or more processors in communication with the first cache and the second cache, the one or more processors configured to:
coordinate eviction of corresponding cache lines from the first cache and the second cache;
compare contents of the first cache with contents of the second cache; and
determine, based on the compare, whether the first processor core or the second processors core is experiencing errors.

11. The system of claim 10, wherein coordinating eviction of corresponding cache lines comprises coordinating a count of committed instructions, and wherein coordinating eviction of corresponding cache lines comprises:
sending, by the first cache, a signal to the second cache requesting a count of committed instructions;
receiving, by the first cache, the count of committed instructions from the second cache; and
comparing the count of committed instructions from the second cache with a count of committed instructions from the first cache.

12. The system of claim 11, wherein:
if the count of committed instructions from the second cache is less than the count of committed stores from the first cache, the ones or more processors evict a line including the committed stores from the first cache to a checker for temporary storage and allowing the second cache to catch up;
if the count of committed instructions from the second cache is greater than the count of committed instructions from the first cache, the one or more processors evict a line including the committed stores from the second cache to the checker for temporary storage and allowing the first cache to catch up; and
if the count of committed instructions from the second cache is the same as the count of committed instructions from the first cache, the one or more processors evict lines from both the first and second cache to the checker.

13. The system of claim 10, wherein coordinating eviction of corresponding cache lines comprises coordinating a count of at least one of loads or stores.

14. The system of claim 10, wherein the first core and the second core operate in an error checking mode, in which the results from each core are compared, for a limited period of time when the first core and the second core are deployed.

15. The system of claim 10, wherein the first core and the second core operate in an error checking mode, in which the results from each core are compared, for an extended period of time when the first core and the second core are in a testing phase.

16. A non-transitory computer-readable medium storing instructions executable by one or more processors for performing a method of detecting silent data corruption, the method comprising:
coordinating eviction of corresponding cache lines from a first cache and a second cache, the first cache storing first results of a first instruction segment executed by a first processor core and the second cache storing second results of execution the first instruction segment by a second processor core;
comparing the first results of the first instruction segment executed by the first processor core with the second results of the first instruction segment executed by the second processor core; and
determining, based on the comparing, whether one of the first or the second processor cores is experiencing errors.

* * * * *